(12) United States Patent
Sambonmatsu

(10) Patent No.: US 6,715,727 B2
(45) Date of Patent: Apr. 6, 2004

(54) CONTAINER HOLDER

(75) Inventor: Tohru Sambonmatsu, Toyota (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/190,816

(22) Filed: Jul. 9, 2002

(65) Prior Publication Data

US 2003/0010786 A1 Jan. 16, 2003

(30) Foreign Application Priority Data

Jul. 13, 2001 (JP) ........................................ 2001-213318

(51) Int. Cl.⁷ ................................................. A47K 1/08
(52) U.S. Cl. ................................................. 248/311.2
(58) Field of Search .................. 248/311.2; 297/188.01, 297/188.19; 224/926

(56) References Cited

U.S. PATENT DOCUMENTS

| | | | |
|---|---|---|---|
| 4,091,958 A | * | 5/1978 | Zemke ........................ 220/291 |
| 5,116,099 A | * | 5/1992 | Kwasnik et al. ............. 248/303 |
| 5,280,848 A | * | 1/1994 | Moore .......................... 224/282 |
| 5,520,313 A | * | 5/1996 | Toshihide .................... 224/539 |
| 5,603,540 A | * | 2/1997 | Shibao .................. 292/341.15 |
| 5,620,122 A | * | 4/1997 | Tanaka ........................ 224/275 |
| 5,639,002 A | * | 6/1997 | Weitbrecht et al. ......... 224/539 |
| 5,718,405 A | * | 2/1998 | Adachi ..................... 248/311.2 |
| 5,893,478 A | * | 4/1999 | Maruoka ...................... 16/354 |

\* cited by examiner

*Primary Examiner*—Leslie A. Braun
*Assistant Examiner*—Kofi Schulterbrandt
(74) *Attorney, Agent, or Firm*—Kanesaka & Takeuchi

(57) ABSTRACT

A container holder for holding a container therein is formed of a box member having an opening, and a lid member for opening and closing the opening of the box member. Axial plates extend from end portions of the lid member. Engaging projections are formed on the axial plates or the side surfaces of the box member to project toward the side surfaces or the axial plate, and guide dent sections with bottom surfaces are formed on the outer side surfaces of the box member or the axial plates for engaging the engaging projection therein.

11 Claims, 10 Drawing Sheets

CONTAINER HOLDER

BACKGROUND OF THE INVENTION AND RELATED ART STATEMENT

The present invention relates to a container holder, in which a lid for closing an opening of a box member is attached to the box member to be capable of opening and closing the box member.

As shown in FIG. 9, a container holder provided in a center console of an automobile is formed of a main body 106 and a lid 100. A pair of axial supporting portions 100A is formed at both sides of the lid 100, and metal shafts 102, 104 are fixed on each supporting portion 100A with a predetermined distance away from each other.

On the other hand, the main body 106 includes a retaining portion 108, so that the lid 100 opens and closes the retaining portion 108. A guide hole or dent 110 is formed at each side of the main body 106, and the metal shafts 102, 104 pass through or enter the guide hole 110 to move along the same.

An arm member 112 is disposed outside the main body 106 and attached to the ends of the metal shafts 102, 104. The arm member 112 includes a cutout portion 112A to which the metal shaft 102 can enter, a support portion 112B for supporting the metal shaft 104, and a center shaft portion 112C as a rotational center of the arm member 112. Therefore, when the lid 100 is opened, the metal shafts 102, 104 move along the guide hole 110 around the center shaft portion 112C.

The guide hole 110 has a branch hole 110A in an arc shape diverging therefrom. In the condition that the lid 100 is closed, the metal shaft 104 is located at one end of the guide hole 110, and the meal shaft 102 is located at one end of the branch hole 110A.

When the lid 100 is opened, the metal shaft 102 moves along the cutout portion 112A of the arm member 112 and rotates along the branch hole 110A around the metal shaft 104, and the shaft 102 comes to the guide hole 110. Then, the metal shafts 102, 104 move along the guide hole 110 around the center shaft portion 112C.

As stated above, the rotational center when the lid 100 is opened is changed in the middle of the rotation, so that the lid 100 can be located behind the main portion 106. When the lid is opened, the lid 100 does not hinder the access to the main body.

However, the guide hole 110 and the metal shafts 102, 104 are exposed in the retaining portion 108 of the main body 106, so that neatness of the box member is prevented. Also, in order to improve sliding ability of the metal shafts 102, 104 sliding in the guide hole 110, grease is applied in the guide hole 110. In this case, grease may be attached to the inner side of the main body 106 to become dirty.

The present invention has been made in view of the foregoing, and an object of the invention is to provide a container holder, in which the lid can be attached to the main body to be opened and closed without forming a guide hole at an inner surface of the main body.

Another object of the invention is to provide the container holder as stated above, in which the smooth operation of the lid can be obtained.

Further objects and advantages of the invention will be apparent from the following description of the invention.

SUMMARY OF THE INVENTION

To achieve the aforementioned objects, in the first aspect of the invention, a lid for closing an opening of a box member is attached to the box member such that the lid can be opened and closed. Both end portions of the lid are provided with shaft portions, i.e. bosses. Guide sections formed in the box member guide the shaft portions, so that the lid is opened and closed.

Here, a shock-absorbing member is formed at the guide section or the shaft portion, to thereby provide a sliding resistance when opening and closing the lid. Accordingly, a kinetic energy of the lid is decreased, to thereby reduce an impact when the lid abuts against the main body.

More specifically, the shock-absorbing member may be provided at an end of the shaft portion, and the shock-absorbing member slides within the guide section to provide the sliding resistance when opening and closing the lid. Alternatively, a grain, coating or the like may be applied inside the guide section to thereby increase the surface friction coefficient in the guide section, so that the sliding resistance is created when opening and closing the lid.

According to the second aspect of the invention, shaft portions are formed at both end portions of a box member, and a guide section formed in a lid is guided along the shaft portions, to thereby open and close the lid. Here, the shock-absorbing member is provided at the guide section or the shaft portion, so as to provide the sliding resistance when opening and closing the lid.

According to the third aspect of the invention, a shock-absorbing member is formed of a flexible member provided in the shaft portion, and the width of the flexible member is set to be larger than an inner width of the guide section.

Therefore, even if a space is formed between the shaft portion and the guide section due to dimensional variation of the shaft portion or the guide section, the variation can be absorbed by the shock-absorbing member provided at the guide section or the shaft section. Thus, the lid does not become shaky when opening or closing the lid, and smooth operation thereof can be obtained. Also, the shock-absorbing member slides along not only a bottom surface of the guide section but also a sidewall of the guide section, so that the sliding resistance by the shock-absorbing member can be stabilized.

According to the fourth aspect of the invention, a projected wall, along which an axial end portion of a flexible member slides, is provided at a bottom surface of a guide section.

If the flexible member slides along an entire surface of the bottom surface and sidewalls of the guide section, the sliding force becomes too strong, resulting in rather a problem when opening or closing the lid. Therefore, the projected wall, along which the axial end portion of the flexible member slides, is provided to extend on the bottom surface of the guide section, so that the flexible member slides along the sidewalls of the guide section and the projected wall, to thereby obtain the adequate sliding force.

According to the fifth aspect of the invention, an urging device generates rotational moment for the lid. The guide section is provided with an inflection portion for changing a direction of the moment generated by the urging device. Thus, when the shaft portion passes through the inflection portion, the lid is automatically opened or closed by a force of the urging device.

BRIEF DESCRIPTION OF THE DRAWINGS

FIGS. 10(A) and 10(B) are schematic plan views showing a part of the holding plate provided in the lid of the container holder according to the embodiment of the invention, wherein FIG. 10(A) shows a state that the holding plate is laid down, and FIG. 10(B) shows a state that the holding plate is raised up.

DETAILED DESCRIPTION OF PREFERRED EMBODIMENTS

Hereunder, a container holder according to an embodiment of the invention will be explained in detail with reference to the accompanying drawings.

Figure 1:
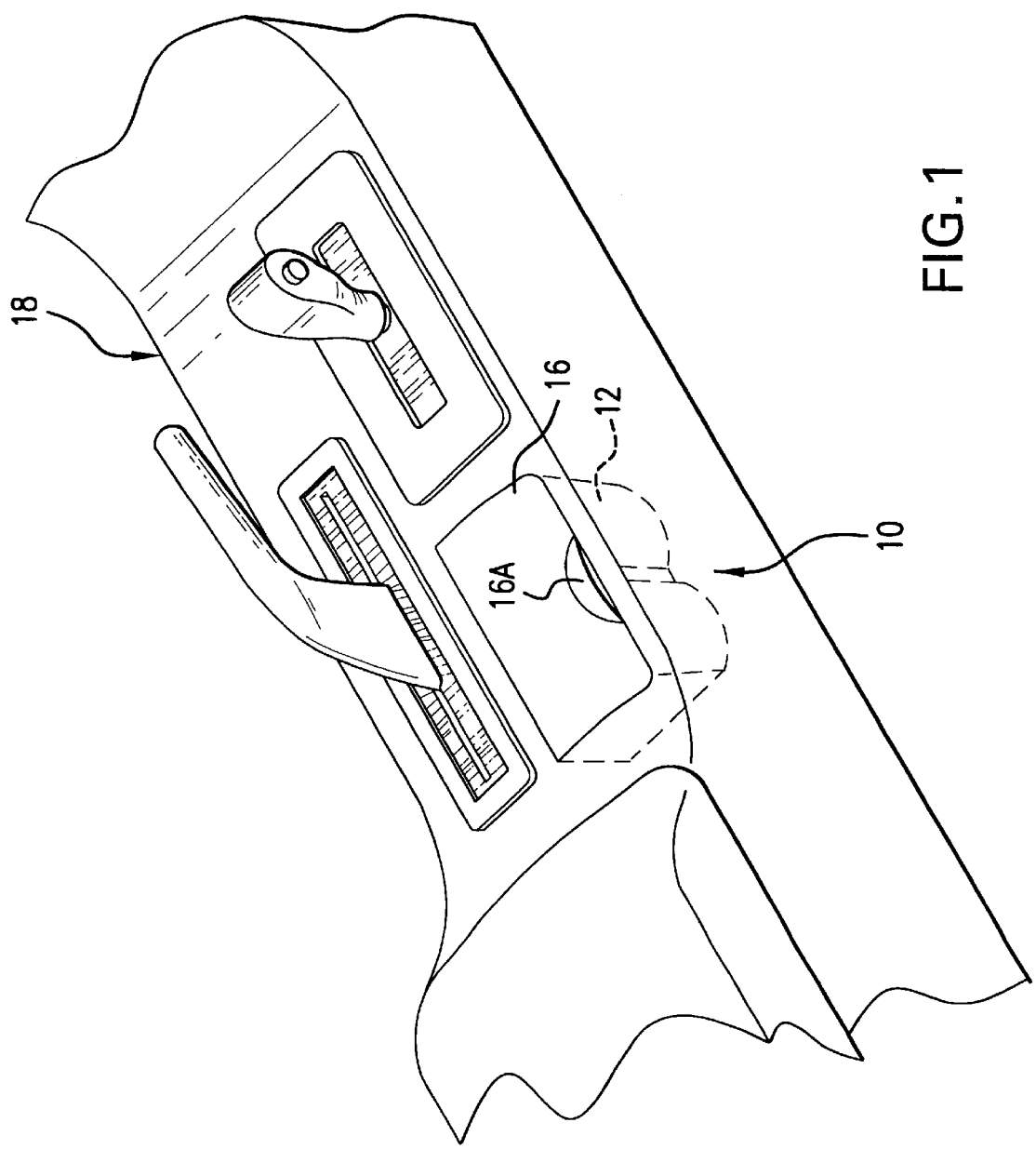
FIG. 1 is a perspective view showing a container holder according to an embodiment of the invention provided in a center console of an automobile.
Figure 2:
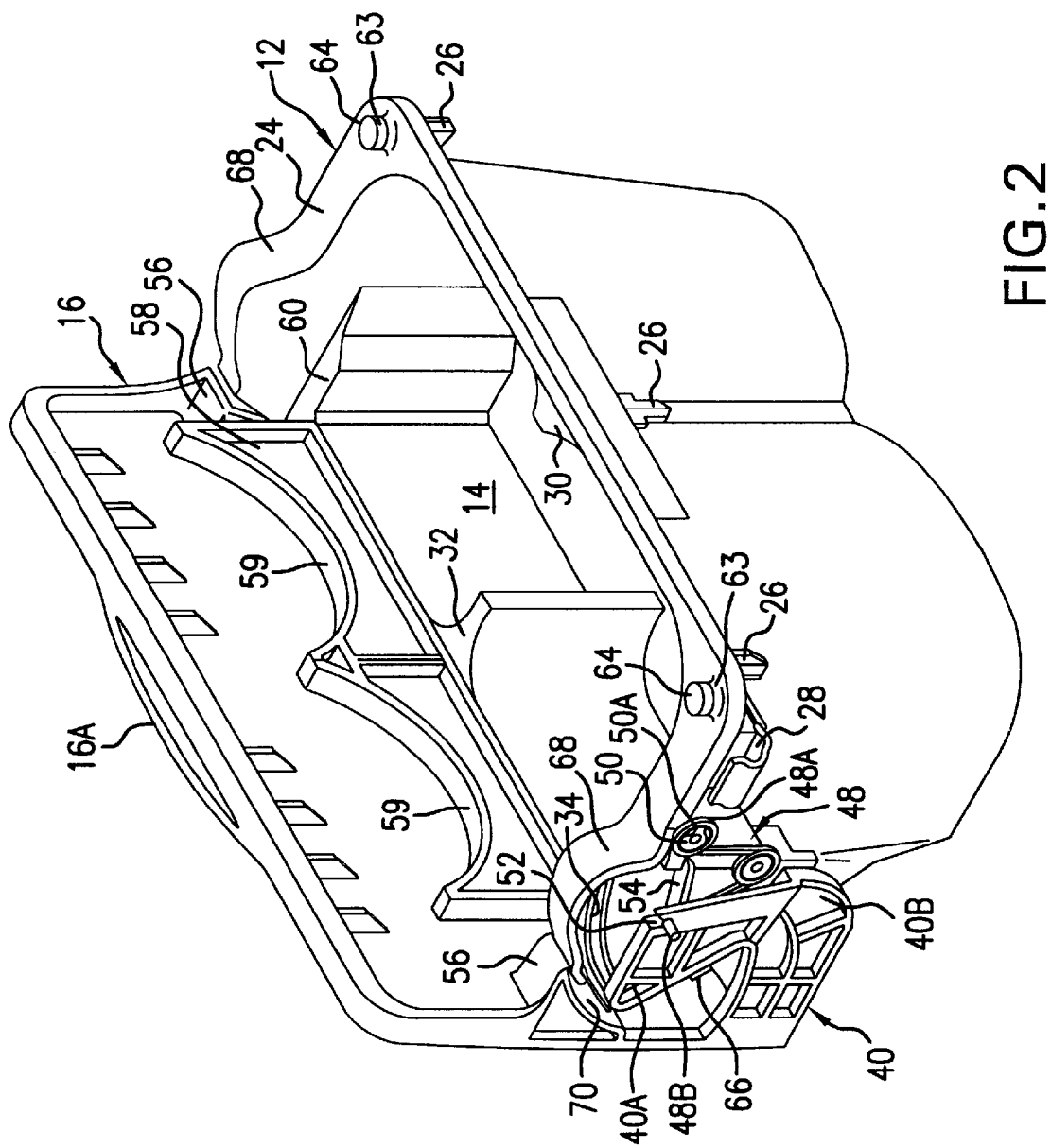
FIG. 2 is a perspective view showing a state that a holding plate disposed in the container holder of the embodiment is raised.
Figure 5:
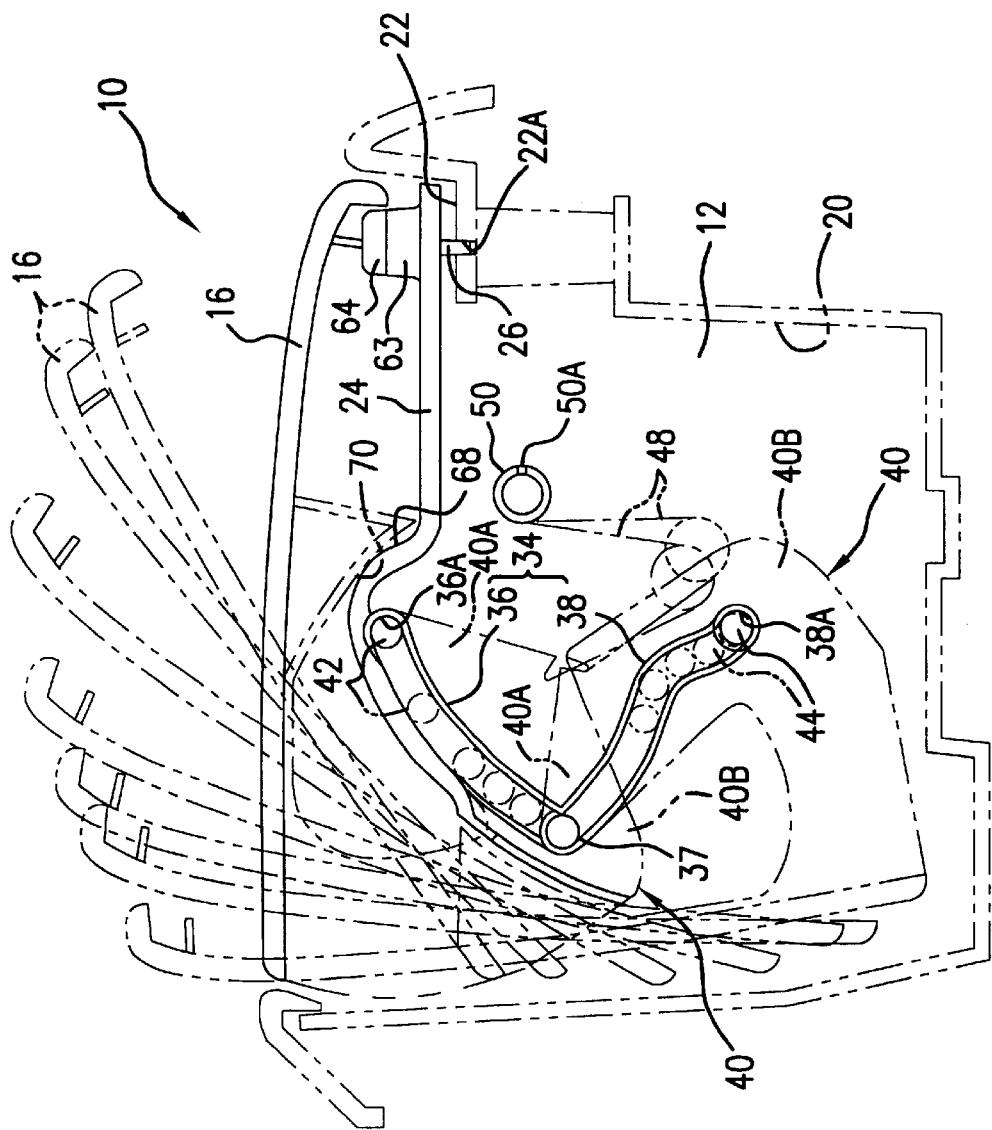
FIG. 5 is a side view showing movements of a lid when the lid of the container holder of the embodiment is opened or closed.

FIG. 1, FIG. 2 and FIG. 5 show a container holder 10 according to the embodiment of the invention. The container holder 10 is provided at a center console 18 disposed between a driver's seat and a front passenger's seat in an automobile, and the container holder 10 can be accommodated in a mounting concave portion 20 formed in a concave shape in the center console 18.

The mounting concave portion 20 is provided with a step portion 22, and positioning holes 22A are formed in the step portion 22. Projections 26 formed at a flange 24 of a main body 12 forming the container holder 10 are inserted into the positioning holes 22A to thereby position the main body 12.

Figure 4:
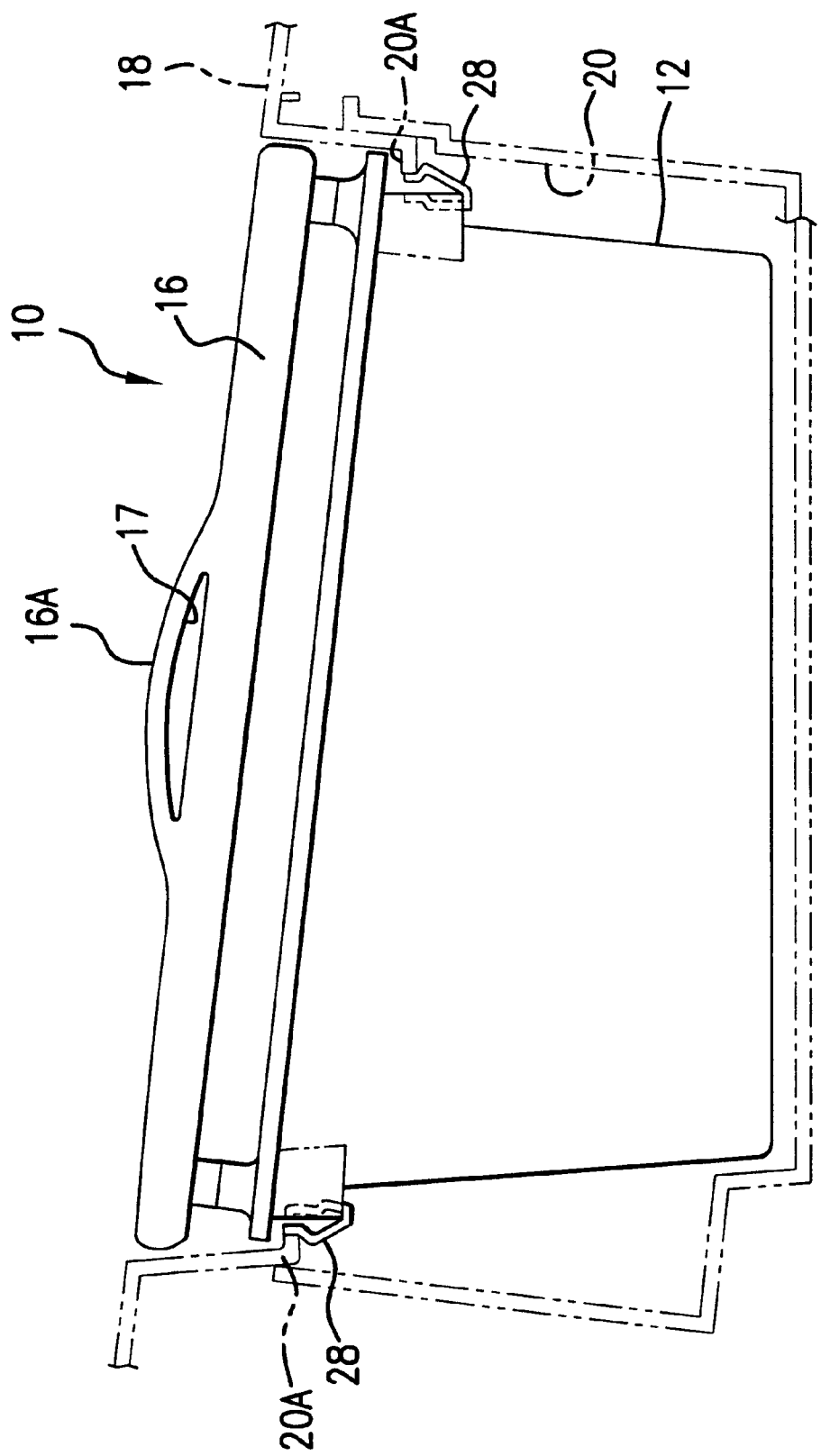
FIG. 4 is a front view showing a state that the container holder of the embodiment is fixed to a mounting concave portion of the center console.

Also, as shown in FIG. 4, engaged portions 20A are formed at both side portions of the mounting concave portion 20, and claws 28 formed at both side portions of the main body 12 can be engaged with the engaged portions 20A. In a state that the claws 28 are engaged with the engaged portions 20A, the container holder 10 is fixed to the mounting concave portion 20.

Figure 3:
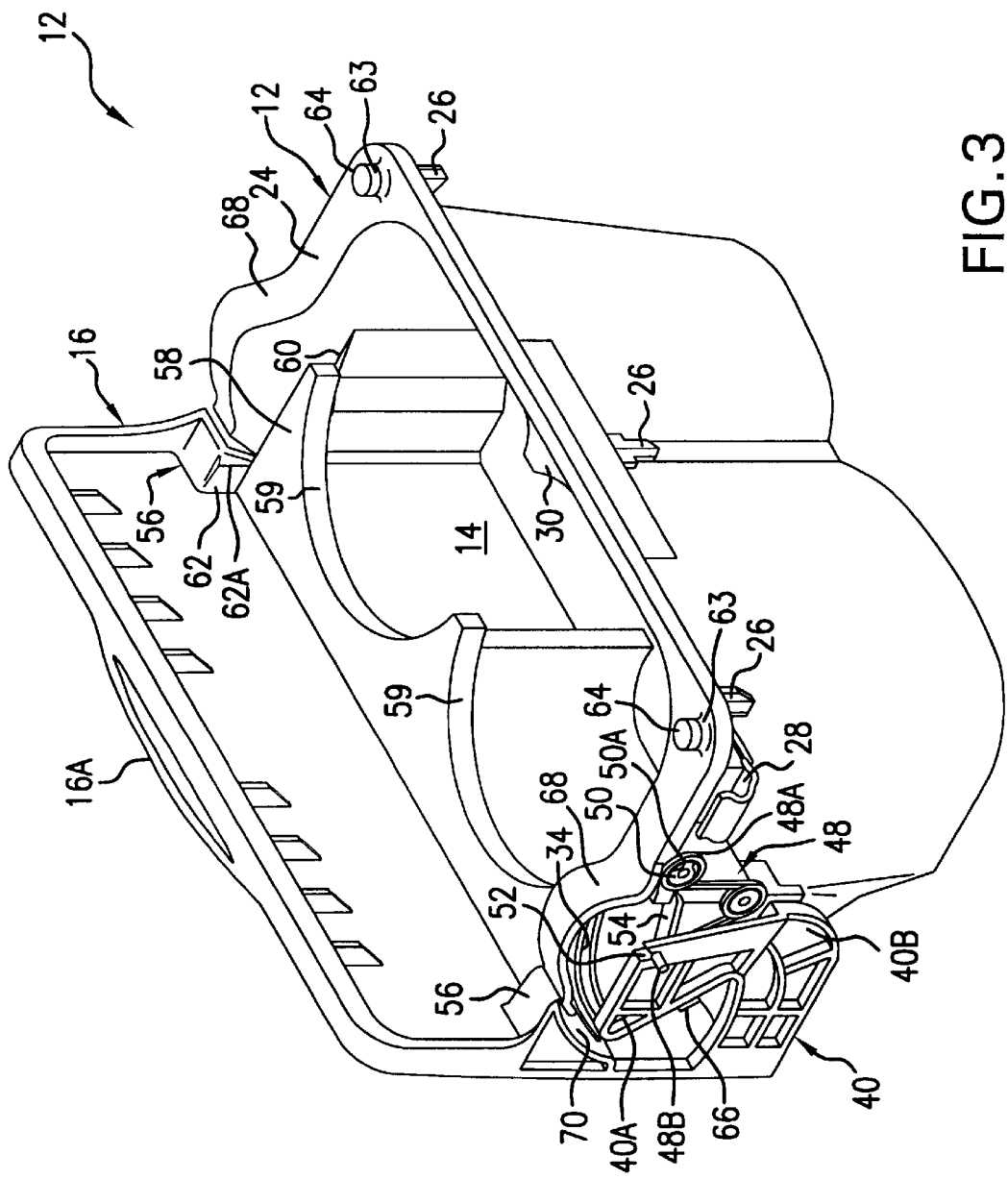
FIG. 3 is a perspective view showing a state that the holding plate disposed in the container holder of the embodiment is laid down.

Here, as shown in FIG. 2 and FIG. 3, the container holder 10 is formed of the main body 12 and the lid 16, and the lid 16 is attached to the main body 12 to be capable of opening and closing. A holding section 14 that is opened and closed by the lid 16 is formed in the main body 12, and a container having a large outer diameter, such as a PET (polyethylene terephthalate) bottle, can be held in the holding section 14.

Also, receiving sections 30, 32, which have mountain shapes with apexes thereof directed inwardly, are provided at the center of the inner surface of the main body 12 in a longitudinal direction such that the receiving sections 30, 32 face each other. The receiving sections 30, 32 support the container held in the holding section 14 such that the container does not turn over sideways.

Further, placing tables 60 are formed at the same height as the receiving section 32 in a width direction of an inner surface of the main body 12. When a holding plate 58 rotatably attached to the lid 16 is tilted or laid down, the holding plate 58 is placed on the placing tables 60. In this state, the holding plate 58 is parallel to a bottom surface of the main body 12, and a side surface of the container held in the holding section 14 is supported by a support section 59.

The support section 59 extends toward more inner side than the receiving section 32. Accordingly, in the case of holding a container with a large outer diameter, such as the PET bottle, the container is supported by the receiving sections 30, 32. In the case of holding a container having a small outer diameter, the holding plate 58 is tilted or laid down, and the container is supported by the receiving section 30 and the support section 59.

As shown in FIG. 5, a guide section 34 is formed at an outer side surface of the main body 12. The guide section 34 has a substantially dog-leg shape, and is roughly divided into a guide region 36, which extends from a rim portion 36A to a bent portion 37, and a guide region 38, which extends from the bent portion 37 to a rim portion 38A.

Also, axial plates 40 having a hook shape extend from both end portions of the lid 16. Bosses 42, 44 are respectively projected inwardly from a distal end portion 40A and a bent portion 40B of each axial plate 40. Also, shock-absorbing members 72 formed of flexible members are respectively fitted into distal end portions of the bosses 42, 44.

Figure 8:
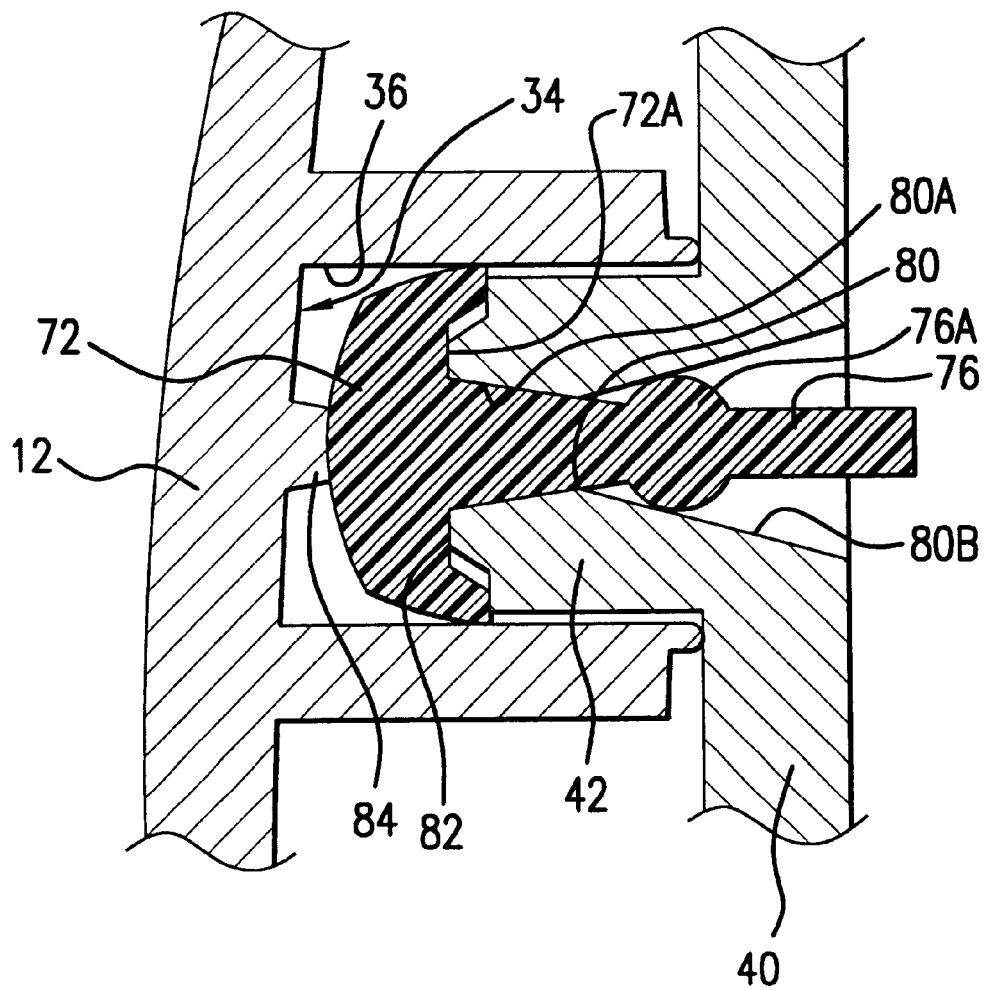
FIG. 8 is a sectional view showing a state that the shock-absorbing member fitted to the boss in the lid is engaged with an inside of a guide section provided in a main body of the container holder of the embodiment.
Figure 9:
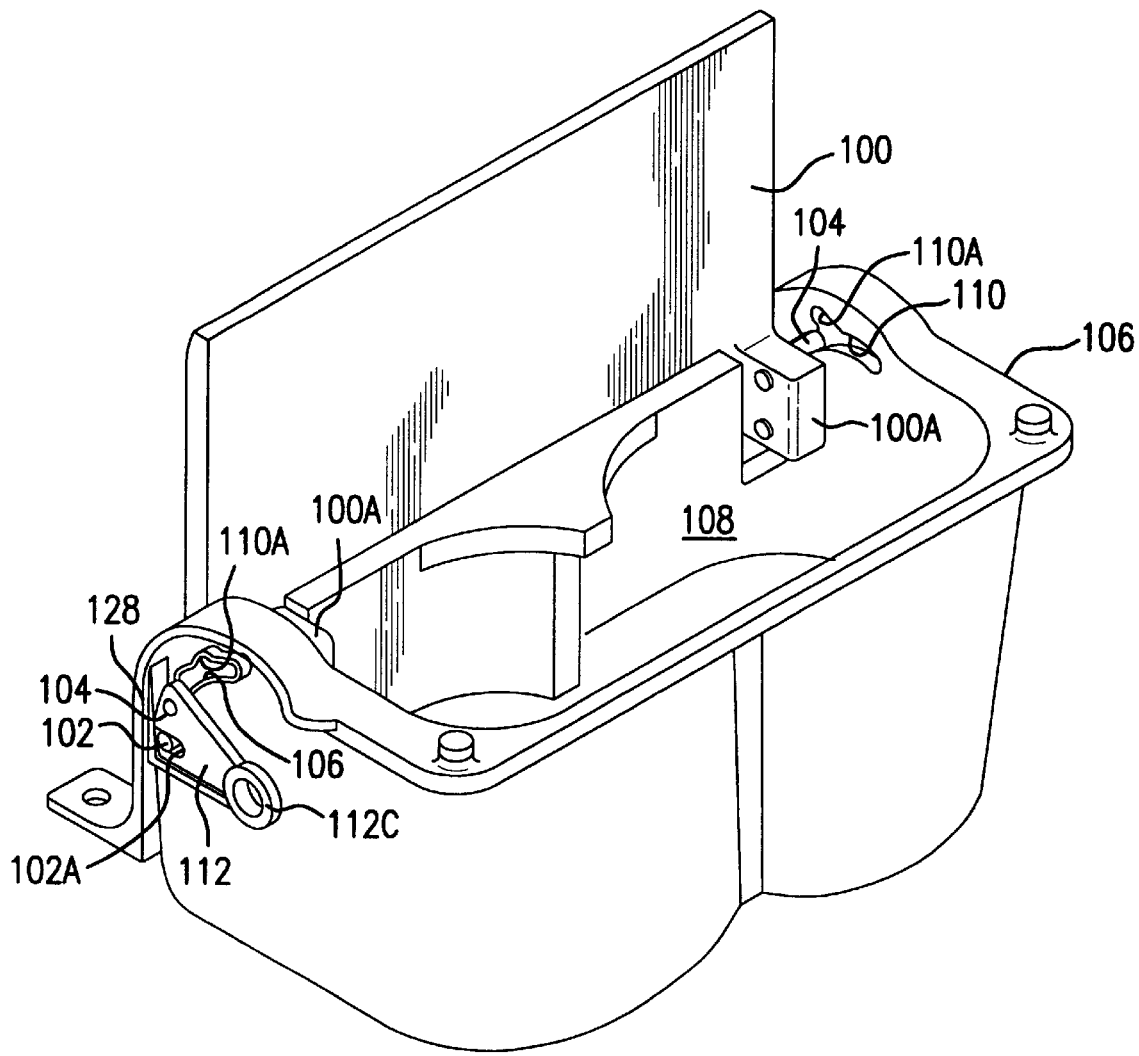
FIG. 9 is a perspective view showing a lid of a conventional container holder when the lid of the conventional container holder is opened.

A width of each shock-absorbing member 72 is set to be larger than that of the guide section 34. When the axial plate 40 is disposed outside the main body 12 and the boss 42 is inserted into the guide region 36 as shown in FIG. 8, the shock-absorbing member 72 fitted to the distal end portion of the boss 42 is accommodated in the guide region 36 in a state that a peripheral rim portion of the shock-absorbing member 72 is bent. Incidentally, the boss 44 is substantially the same as the boss 42, so that the boss 44 is not shown in FIG. 8, and an explanation thereof is omitted herewith.

Accordingly, the bosses 42, 44 into which the shock-absorbing members 72 are fitted are movable along the guide section 34. When the boss 42 moves within the guide region 36 and the boss 44 moves within the guide region 38, the lid 16 can be opened or closed, so that the holding section 14 can be opened and closed.

Since the guide section 34 is provided on the outer side surface of the main body 12 and engaged with the bosses 42, 44 from outside of the main body 12, there is no need to provide a guide hole on the inner surface of the main body as in the conventional container holder. Therefore, the appearance of the container holder is not deteriorated.

Also, even if grease is applied inside the guide section 34 so as to improve a sliding movement of the bosses 42, 44, the inner surface of the main body 12 stays clean. Further, the axial plate 40 and the boss 42 or 44 can be integrally formed, so that the number of the constituent parts can be reduced as compared with the conventional container holder, resulting in lowering a manufacturing cost of the container holder.

Figure 6:
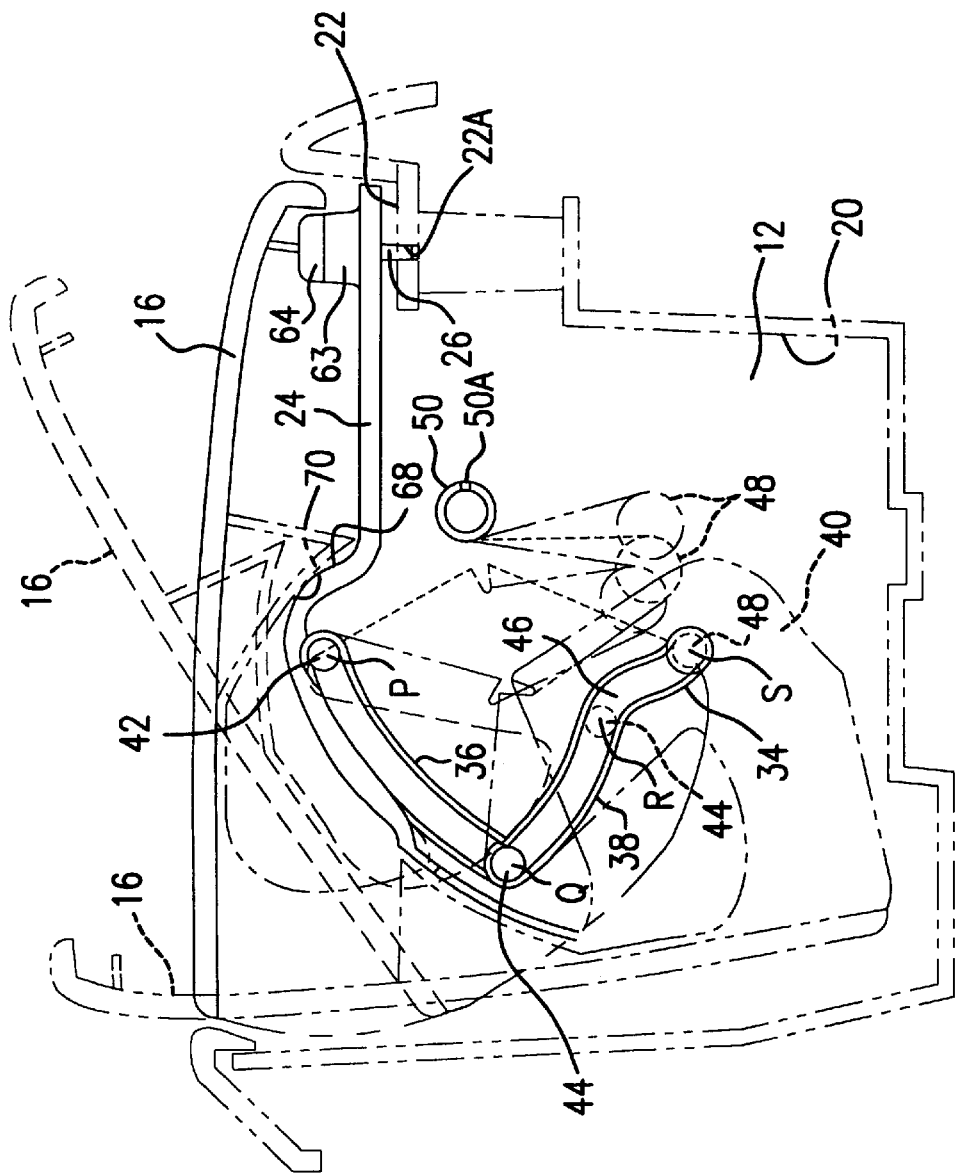
FIG. 6 is a side view showing movements of the lid when the lid of the container holder of the embodiment is opened or closed.

As shown by a solid line in FIG. 6, when the lid 16 is closed, the boss 42 is located at a point P in the guide region 36. When the lid 16 is being opened, the boss 44 is moved from a point Q to a point R along the guide region 38 around the boss 42 as a center, so that a rear side of the lid 16 is pulled down toward a lower side of the main body 12 as shown by broken lines in FIG. 6.

When the lid 16 is opened for a predetermined angle as described above, the boss 42 is moved from the point P toward a point Q along the guide region 36. As the boss 42 is moved as described above, the boss 44 is moved from the point R to a point S along the guide region 38.

Accordingly, the lid 16 is accommodated at a back surface of the main body 12 as shown by one-dotted chain lines. As described above, a center of the rotation of the axial plate 40 is changed after the lid 16 is opened with the predetermined angle, and the lid 16 is accommodated at the back surface of the main body 12. Therefore, the opened lid 16 does not become an obstacle.

Also, since the bosses 42, 44 are respectively moved within the different guide regions 36, 38, it is possible to gradually change the center of the rotation, so that the movement of the lid 16 is smooth.

Here, the guide region 38 traces gently along a convex or undulated line in which a center of the arc is reversed at middle thereof, and a portion of the guide region 38 at an apex of the convex line constitutes an inflection portion 46. If the boss 44 passes through the inflection portion 46, a direction of rotational moment of the lid 16, which is generated when the torsion spring 48 presses the axial plate 40, is changed. Therefore, when the boss 44 passes through the inflection portion 46, the lid 16 is automatically opened or closed by the torsion spring 48.

As shown in FIG. 3, a boss 50 projects from the outer side surfaces of the main body 12, and one end portion of the torsion spring 48 can be engaged with and stopped by the boss 50. Also, an annular portion 48A having an inner diameter slightly larger than the outer diameter of the boss 50 is formed at one end portion of each torsion spring 48. A holding piece 50A is protruded at a distal end of the boss 50. When the annular portion 48A is hooked on the holding piece 50A and fitted around the boss 50, the annular portion 48A is engaged with and stopped by the boss 50.

Also, a hook portion 48B is formed at the other end of each torsion spring 48, and can be engaged with a slit 52 formed between the distal end portion 40A and the bent portion 40B of the axial plate 40. The hook portion 48B is pushed to be deep inside the slit 52 by the torsion spring 48, so as not to disengage from the slit 52.

After the annular portion 48A is hooked on the holding piece 50A and fitted around the boss 50 to be engaged therewith, by merely sliding the hook portion 48B along the shape of the slit 52, the hook portion 48A can be engaged with and stopped by the slit 52, so that the torsion spring 48 is attached to the axial plate 40 and the main body 12. Therefore, it is easy to attach the torsion spring 48.

According to the above structure, one end portion of the torsion spring 48 is attached to the main body 12, and the other end portion of the torsion spring 48 is attached to the axial plate 40. Then, when the torsion spring 48 presses the axial plate 40, moment for rotating the lid 16 can be obtained.

A rib 54 is provided at the outer side surface of the main body 12 to extend from the point R in the guide section 34 toward the boss 50, so that the hook portion 48B of the torsion spring 48, which is contracted or expanded due to movement of the axial plate 40, is prevented from disengaging from the slit 52.

Also, in a state that the torsion spring 48 is engaged with the slit 52, a space is formed between a distal end portion of the rib 54 and the torsion spring 48. Thereby, the torsion spring 48 is prevented from sliding along the rib 54 in accordance with the axial plate 40, thereby eliminating a noise.

As shown in FIG. 2, FIG. 3 and FIGS. 10(A) and 10(B), a pair of axial support sections 56 provided in series in a longitudinal direction is disposed on the rear surface of the lid 16. The axial support sections 56 support pins 58A projected from both ends of the holding plate 50, 50 that the holding plate 58 is rotatably attached to the axial support sections 56. Also, two arc-shaped support sections 59 are formed at a free end side of the holding plate 58.

Storing projections 62 having mountain shapes are formed at the axial support sections 56 to face each other. A distance between apexes 62A of the storing projections 62 is slightly shorter than a length of the holding plate 58.

Also, chamfered portions 58B are formed on the rear surface of the holding plate 58 at both ends thereof. Accordingly, when the holding plate 58 passes through the apexes 62A of the storing projections 62, the chamfered portions 58B abut against inclined surfaces 62B of the storing projections 62.

Therefore, when the holding plate 58 is made in contact with the rear surface of the lid 16 (the holding plate 58 is raised up), the side surfaces of the holding plate 58 slide on the storing projections 62. Then, when passing through the apexes 62A, the axial support sections 56 are pushed away from each other by the side surfaces of the holding plate 58, so that the holding plate 58 can pass through the apexes 62A.

Figure 10A:
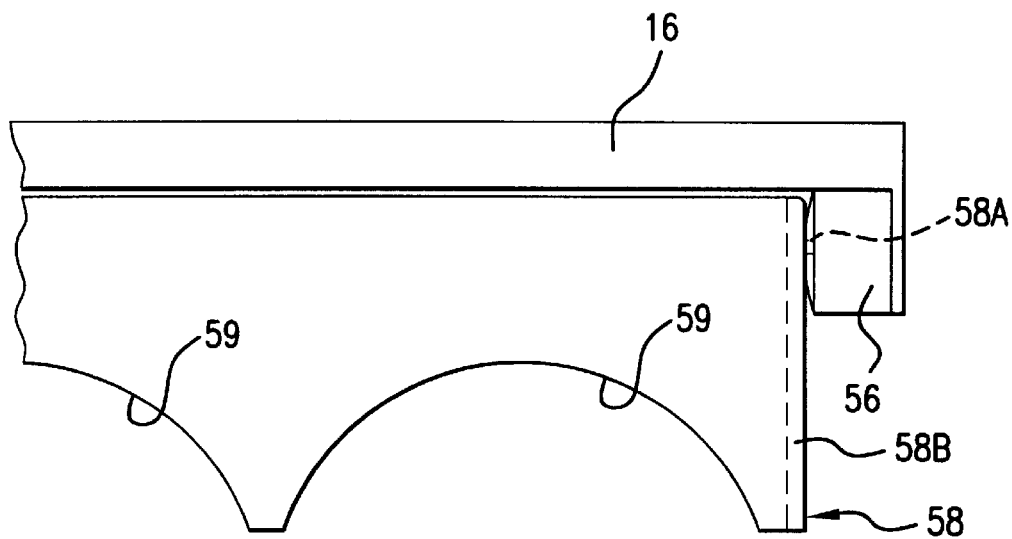
Figure 10B:
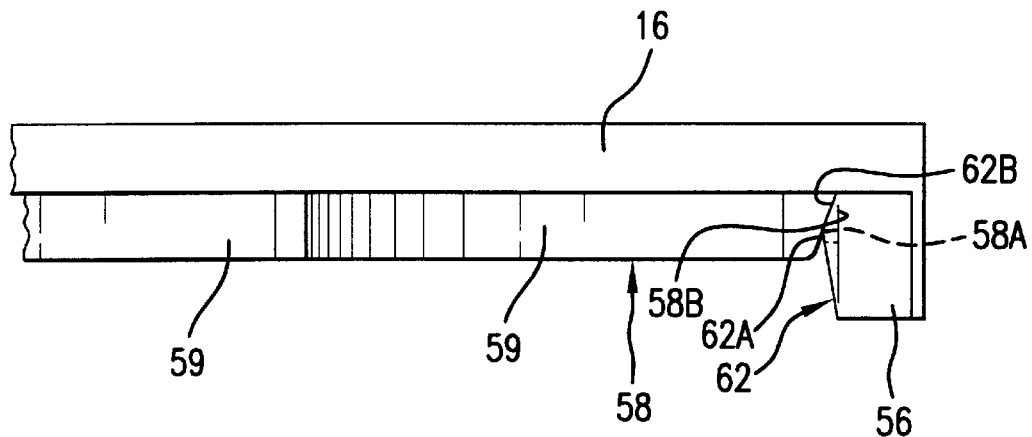

At this time, the axial support sections 56 pushed away from each other are returned to an original state to clamp the holding plate 58. At the same time, the holding plate 58 is fixed by the storing projections 62 in a state that the holding plate 58 abuts against the rear surface of the lid 16 as shown in FIG. 10(B).

Accordingly, when the holding plate 58 is not in use, the holding plate 58 can be fixed by the storing projections 62 in the state that the holding plate 58 abuts against the rear surface of the lid 16. Therefore, the holding plate 58 does not vibrate even if the vehicle vibrates. Also, since a fixing member for fixing the holding plate 58 is not required, the number of the constituent parts can be reduced.

Further, before the holding plate 58 passes through the apexes 62A of the storing projections 62, the holding plate 58 is urged toward a direction of lying down by the storing projections 62. Therefore, even if an outer diameter of a container is between a size of the container supported by the receiving sections 30, 32 and a size of the container supported by the support section 59 and the receiving section 30, the rim of the holding plate 58 is pressed against the container, so that the container can be supported. Therefore, the container holder can support a wide range of containers in terms of size.

A front side of the main body 12 is slashed downwardly, and a front side of the flange 24 is slashed downwardly in accordance therewith. A rear side of the flange 24 traces a gentle curve along a shape of the guide region 36, and the slashed portion becomes an abutting surface 68.

The axial support portion 56 of the lid 16 has a gently inclined surface 70 inclined gently from the rear side to the front side of the lid 16. Thus, when the lid 16 is closed, the inclined surface 70 abuts against the abutting surface 68, so that the lid 16 in the closed state is not shifted.

Also, as shown in FIG. 1 and FIG. 4, a gentle convex portion 16A is formed at a center of the longitudinal direction of the ceiling of the lid 16, and a length of the outer peripheral wall of the convex portion 16A is longer than that of the other corresponding portion in the lid 16. The outer peripheral wall of the convex portion 16A is dented to have an engaging dent 17, where a finger is engaged to facilitate opening of the closed lid 16.

As shown in FIG. 2, cushion member storing sections 63 project at the flange 24 of the main body 12, and cushion members 64 are attached in the cushion member storing sections 63. When the lid 16 is closed by the force generated by the torsion spring 48, the cushion members 64 abut against an inner peripheral wall of the lid 16 to prevent of the lid 16 from being shifted in the closed state.

Also, a sponge member 66 is bonded to the bent portion 40B of each axial plate 40. When the lid 16 is closed, the sponge member 66 abuts against the flange 24 to absorb the impact upon closing the lid 16.

As described above, the axial plate 40 abuts against the flange 24 through the sponge member 66, to thereby moderate an impact when the boss 44 collides against the sidewall of the guide region 38 at the point Q upon closing the lid 16.

Further, a sponge member, not shown, is bonded to the back surface of the main body 12. Accordingly, the sponge member absorbs the impact when the lid 16 abuts against the back surface of the main body 12 upon opening the lid 16.

As described above, by providing the sponge member 66 and the cushion member 64, impact noises can be absorbed, which are generated when the main body 12 abuts against the lid 16 or when the axial plate 40 abuts against the main body 12.

Next, the main section of the container holder 10 according to the embodiment of the invention will be explained.

Figure 7:
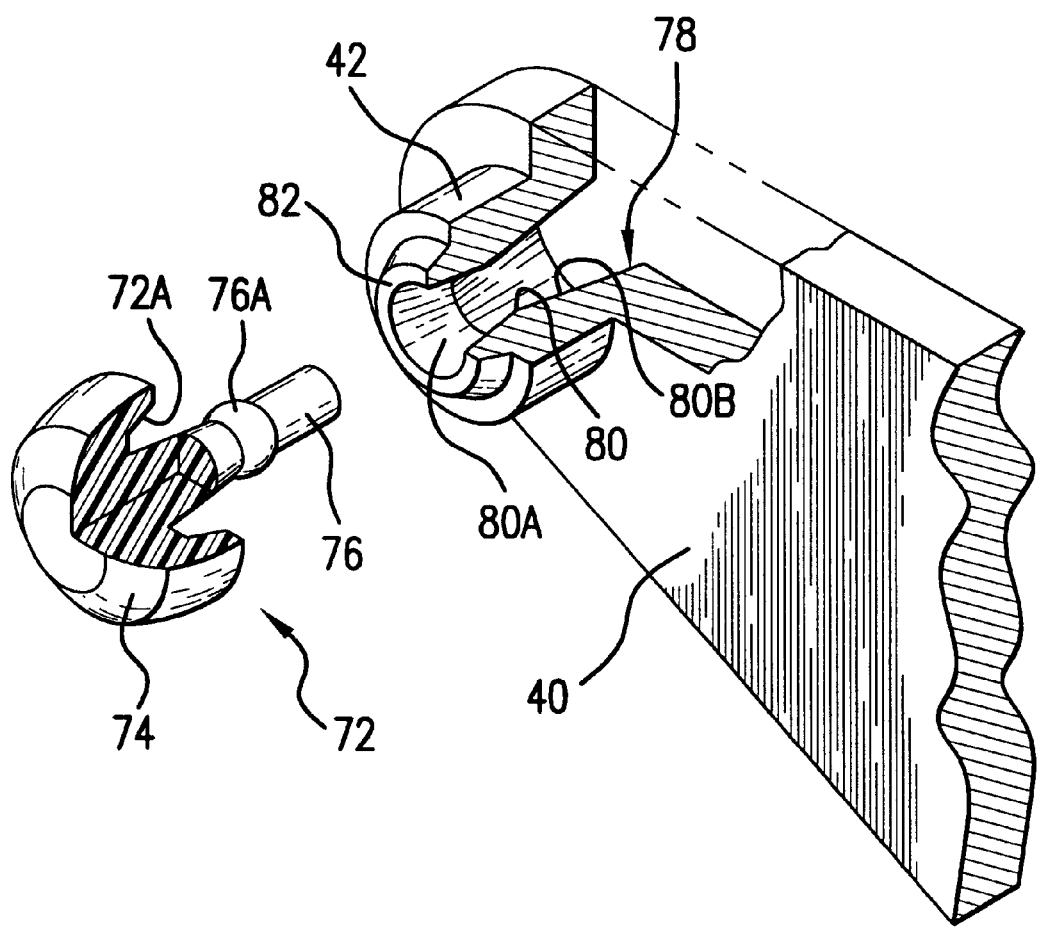
FIG. 7 is an exploded, partly sectional, perspective view showing a boss and a shock-absorbing member provided at an axial plate of the lid of the container holder according to the embodiment.

As shown in FIG. 7 and FIG. 8, the shock-absorbing member 72 has a substantially umbrella shape, and is formed of an umbrella section 74 and a shaft section 76. The umbrella section 74 has a substantially truncated cone shape, and a bottom surface of the umbrella section 74 is dented to have an annular dent portion 72A. Accordingly, a peripheral rim portion of the umbrella section 74 is thinner than other portions of the umbrella section 74, to be more flexible. Also, the shaft section 76 is suspended or projected vertically downwardly from the center of the bottom surface of the umbrella section 74, and an annular engaging portion 76A is provided at the shaft section 76 to be a convex portion thereat.

Also, the boss 42 formed at the axial plate 40 is provided with a hollow section 78, and a reduced diameter portion 80 is formed near a central portion of the boss 42 in an axial direction. The diameter of the hollow portion 78 is smallest at the reduced diameter portion 80, and tapered surfaces 80A, 80B are formed in the axial direction of the boss 42. Incidentally, the boss 44 is substantially the same as the boss 42, so that the boss 44 is not shown in FIG. 8, and explanation thereof is omitted herewith.

The shaft section 76 of the shock-absorbing member 72 is inserted into the hollow section 78, and the engaging portion 76A disposed on the shaft section 76 is flexibly deformed to pass through the reduced diameter portion 80. Then, the engaging portion 76A is engaged with the reduced diameter portion 80, and the shock-absorbing member 72 is attached to each of the bosses 42, 44. As described above, by merely pushing the shock-absorbing members 72 into the bosses 42, 44, the shock-absorbing members 72 can be attached to the bosses 42, 44.

Incidentally, a step portion 82 with a smaller diameter is formed at the distal end portion of the boss 42. A distal end portion of the step portion 82 can be accommodated in the dent portion 72A formed in the umbrella section 74, and the peripheral rim portion of the umbrella section 74 abuts against the distal end portion of the step portion 82 in a state that the peripheral rim portion of the umbrella section 74 is protruded from the outer peripheral surface of the boss 42.

Here, a width of the step portion 82 is smaller than that of the dent portion 72A, and a space is formed between the step portion 82 and the dent portion 72A. Accordingly, when the peripheral rim portion of the umbrella section 74 is pressed, a diameter of the peripheral rim portion of the umbrella section 74 can shrink easily.

Each of the bottom surfaces of the guide region 36 and the guide region 38 formed in the main body 12 is provided with a projection 84, which is projected from a central portion of the guide region 36 or 38 in a width direction and extends along a longitudinal direction of the guide region 36 or 38. The apex of the umbrella section 74 of the shock-absorbing member 72 fitted into the boss 42 accommodated in the guide region 36 abuts against the projection 84. Incidentally, the guide region 38 is substantially same as the guide region 36, so that the guide region 38 is not shown in FIG. 8, and an explanation thereof is omitted herewith.

Therefore, together with opening and closing the lid 16, the apex of the umbrella section 74 of the shock-absorbing member 72 slides along the projection 84, to thereby provide the sliding resistance upon opening and closing the lid 16. Therefore, the lid 16 is opened or closed by the moment generated by the torsion spring 48, and the kinetic energy thereof is decreased, to thereby moderate the impact when the lid 16 abuts against the main body 12.

Also, even if a space is formed between the boss 42 and the guide region 36, a peripheral rim portion of the umbrella section 74 of the shock-absorbing member 72 fitted into the boss 42 can fill the space. Thus, when the lid 16 is opened or closed, the lid 16 does not become shaky, and a smooth operation can be achieved.

Since the width of the umbrella section 74 of the shock-absorbing member 72 is set to be larger than that of the guide region 36, when the umbrella section 74 is accommodated in the guide region 36, the diameter of the peripheral rim portion of the umbrella section 74 is shrunk, so that the umbrella section 74 is made in contact with the sidewalls of the guide region 36. Accordingly, the shock-absorbing member 72 slides along not only the projection 84 of the guide region 36 but also the sidewalls of the guide region 36, so that the sliding resistance by the shock-absorbing member 72 can be stabilized.

Also, if the shock-absorbing member 72 slides along the entire surfaces of the bottom surface and the sidewalls of the guide section 34, the sliding force is too strong, resulting in rather a problem when opening and closing the lid 16. Therefore, the shock-absorbing member 72 slides along the sidewalls of the guide section 34 and the projection 84, so that the adequate sliding force can be obtained.

Incidentally, although the shock-absorbing members 72 are fitted to the distal end portions of the bosses 42, 44 in the embodiment described above, the present invention is not limited thereto, and the shock-absorbing members 72 can be integrally formed with the bosses 42, 44. Also, it will suffice to provide the sliding resistance upon opening and closing the lid 16. Therefore, for example, a grain, a coating or the like may be applied inside the guide section 34 to thereby increase the surface friction coefficient, so that the sliding resistance is generated when the bosses 42, 44 are moved.

Although the bosses 42, 44 are provided in the lid 16 and the guide section 34 is provided in the main body 12 in the embodiment, the present invention is not limited thereto, and the guide section may be provided in the lid and the bosses may be provided in the main body.

In this case, in the condition that the lid 16 is opened in FIG. 6, the axial plate 40 may have a large rectangular shape and provided with the guide regions 36, 38, and bosses 42, 44 may be located to project at the positions P, Q on the main body 12 as shown in FIG. 6. When the lid 16 is closed, the guide region 36 moves along the boss 42 at the position P and the guide region 38 moves along the boss 44 at the position Q. In this case, the shape of the guide region 36 may have the shape as in the guide region 38 and the guide region 38 may have the smooth surface as in the guide region 36.

Further, although the axial plate 40 is provided with the bosses 42, 44 that can respectively move along the guide region 36 and the guide region 38 in the embodiment, only one boss may be provide in the axial plate. Also, although the guide regions 36, 38 are provided continuously in the embodiment, it is not always necessary to provide the guide regions 36, 38 continuously as long as the rotational center of the axial plate 40 is changed at the time of opening the lid 16 such that the lid 16 does not become an obstacle.

Although the slit 52 is formed as an engaged portion between the distal end portion 40A and the bent portion 40B of the axial plate 40 in the embodiment, the present invention is not limited thereto as long as the torsion spring 48 can be attached easily.

For example, instead of the slit 52, a hole can be formed in the axial plate. Also, a pin or the like may be provided in the axial plate so that the torsion spring is hooked on the pin. In this case, however, the shape of the hook portion 48B needs to be changed so that the hook portion can be hooked on the pin easily.

According to the first and second aspects of the invention, the container holder of the invention is structured as described above, so that the energy at the time of opening and closing is decreased. Therefore, the impact caused when the lid abuts against the main body can be moderated.

According to the third aspect of the invention, even if a space is formed between a shaft portion, i.e. boss, and the guide section due to a dimensional variation of the shaft portion or the guide section, the shock-absorbing member provided at the guide section or the shaft portion can absorb the dimensional variation. Therefore, the lid does not become shaky upon opening or closing the lid, to thereby obtain the smooth operation. Also, since the shock-absorbing member slides along not only the bottom surface of the guide section but also the side wall thereof, the sliding resistance by the shock-absorbing member can be stabilized.

Incidentally, if the shock-absorbing member slides along the entire surface of the bottom surface and the sidewall of the guide section, the sliding force may become too strong, resulting in rather a problem at the time of opening and closing the lid. Therefore, according to the fourth aspect of the invention, the shock-absorbing member slides along the sidewall and the projection of the guide section, so that the adequate sliding force can be obtained.

According to the fifth aspect of the invention, when the shaft portion passes through the inflection portion, the lid is automatically opened and closed by the urging force by urging means.

While the invention has been explained with reference to the specific embodiments of the invention, the explanation is illustrative and the invention is limited only by the appended claims.

What is claimed is:

1. A container holder for holding a container therein, comprising:
   a box member having an opening and box end portions,
   a lid member attached to the box member for opening and closing the opening of the box member and having lid end portions,
   shaft members provided at the lid end portions of the lid member or the box end portions for supporting the lid member,
   guide sections formed in the box end portions or the lid end portions for guiding the shaft members therein, and
   shock-absorbing members formed in the guide sections or the shaft members for providing sliding resistance when the lid member moves, each of said shock-absorbing members being formed of a flexible member formed in the shaft member and having a width larger than an inner width of the guide section.

2. A container holder according to claim 1, wherein said guide section includes a projected wall on a bottom surface thereof, said flexible member having an end portion in an axial direction to slide along the projected wall.

3. A container holder according to claim 1, further comprising urging means provided between the lid member and the box member for providing force for rotating the lid member, said guide section having an inflection portion for changing a direction of the force generated by the urging means.

4. A container holder for holding a container therein, comprising:
   a box member having an opening and outer side surfaces,
   a lid member for opening and closing the opening of the box member having end portions,
   axial plates extending from the end portions of the lid member,
   engaging projections formed on the axial plates or the side surfaces of the box member to project toward the side surfaces or the axial plates, aid engaging projections being two bosses arranged on each axial plate with a predetermined interval therebetween,
   guide dent sections with bottom surfaces formed on the outer side surfaces of the box member or the axial plates for engaging the engaging projection therein, each of said guide dent sections having a first guide section and a second guide section connected together, said first guide section allowing the lid member to rotate around one of the two bosses when the one of the two bosses is located at a final end of the first guide section and guiding the one of the two bosses downwardly when the lid member is opened with a predetermined angle, said second guide section guiding the other of the two bosses downwardly when the lid member rotates around the one of the two bosses and guiding the other of the two bosses further downwardly along the movement of the one of the two bosses in the first guide section,
   urging means for pressing one of the axial plates for generating force for rotating the lid member, and
   an inflection portion provided at the second guide section, said inflection portion changing a direction of the force generated by the urging means when the other of the two bosses passes the inflection portion.

5. A container holder according to claim 4, wherein said urging means is formed of a torsion spring having two ends, one end being fixed to one of the outer side surfaces of the box member, and the other end engaging an engaging portion formed in one of the axial plates.

6. A container holder according to claim 4, wherein said axial plates and the engaging projections are integrally formed.

7. Container holder for holding a container therein, comprising:
   a box member having an opening and outer side surfaces,
   a lid member for opening and closing the opening of the box member having end portions,
   axial plates extending from the end portions of the lid member,
   engaging projections formed on the axial plates or the side surfaces of the box member to project toward the side surfaces or the axial plates,
   guide dent sections with bottom surfaces formed on the outer side surfaces of the box member or the axial plates for engaging the engaging projection therein,
   a holding plate rotatably attached to a rear surface of the lid member for supporting the container when the holding plate is laid down, and
   a storing projection provided in the lid member and fixing the holding plate so that the holding plate keeps contact a rear surface of the lid member.

8. A container holder for holding a container therein, comprising:
   a box member having an opening, box end portions, and front and back sides,
   a lid member attached to the box member for opening and closing the opening of the box member and having lid end portions,
   shaft members provided at the lid end portions of the lid member or the box end portions for supporting the lid member, and
   guide sections formed in the box end portions or the lid end portions for guiding the shaft members therein, each of said guide sections including a first guide section extending obliquely upwardly from the back side to the front side and having a lower end, and a second guide section extending obliquely downwardly from the lower end of the first guide section to the front side in a condition that the lid member closes the opening.

9. A container holder according to claim 8, further comprising shock-absorbing members formed in the guide sections or the shaft members for providing sliding resistance when the lid member moves.

10. A container holder according to claim 8, wherein said shaft members includes two shafts located in two end portions of the first or second guide section in the condition that the lid member closes the opening, and located in two end portions of the second or first guide section in a condition that the lid member opens the opening.

11. A container holder according to claim 10, further comprising urging means pressing the lid end portion for generating force for rotating the lid member, and an inflection portion provided at the second guide section, said inflection portion changing a direction of the force generated by the urging means when one of the two shafts passes the inflection portion.

* * * * *